United States Patent
Ross et al.

(10) Patent No.: US 8,468,169 B2
(45) Date of Patent: Jun. 18, 2013

(54) HIERARCHICAL SOFTWARE LOCKING

(75) Inventors: Jonathan Ross, Woodinville, WA (US);
Ronald Aigner, Redmond, WA (US);
Jan Simon Rellermeyer, Zurich (CH);
Jork Loeser, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 82 days.

(21) Appl. No.: 12/958,396

(22) Filed: Dec. 1, 2010

(65) Prior Publication Data

US 2012/0143838 A1   Jun. 7, 2012

(51) Int. Cl.
*G06F 17/30* (2006.01)

(52) U.S. Cl.
USPC .......................................... 707/791; 707/802

(58) Field of Classification Search
USPC ................................... 707/791, 802
See application file for complete search history.

(56) References Cited

U.S. PATENT DOCUMENTS

| | | | |
|---|---|---|---|
| 4,320,455 A * | 3/1982 | Woods et al. ................. | 710/200 |
| 5,613,139 A | 3/1997 | Brady | |
| 7,395,382 B1 | 7/2008 | Moir | |
| 7,571,270 B1 | 8/2009 | Nemirovsky et al. | |
| 2005/0060559 A1* | 3/2005 | McKenney ................... | 713/190 |
| 2007/0169042 A1* | 7/2007 | Janczewski ................... | 717/149 |
| 2008/0109632 A1* | 5/2008 | Vishlitzky et al. ............ | 711/209 |
| 2008/0228896 A1* | 9/2008 | Krig .............................. | 709/212 |
| 2008/0276025 A1 | 11/2008 | Cherem et al. | |
| 2009/0006808 A1* | 1/2009 | Blumrich et al. ............... | 712/12 |
| 2010/0023706 A1 | 1/2010 | Christie et al. | |
| 2010/0332538 A1* | 12/2010 | Gray et al. ..................... | 707/774 |

OTHER PUBLICATIONS

Goetz, Brian, "Java theory and practice: Going atomic", Retrieved at <<http://www.ibm.com/developerworks/java/library/j-jtp11234/>>, Nov. 2004, pp. 9.

Duffy, Joe, "Using concurrency for scalability", Retrieved at << http://msdn.microsoft.com/en-us/magazine/cc163552.aspx>>, Sep. 2006, pp. 11.

\* cited by examiner

*Primary Examiner* — Son T Hoang

(57) ABSTRACT

A processor chip may have a built-in hardware lock and deterministic exclusive locking of the hardware lock by execution units executing in parallel on the chip. A set of software locks may be maintained, where the execution units set and release the software locks only by first acquiring a lock of the hardware lock. A first execution unit sets a software lock after acquiring a lock of the hardware lock, and other execution units, even if exclusively locking the hardware lock, are unable to lock the software lock until after the first execution unit has reacquired a lock of the hardware lock and possibly released the software lock while exclusively locking the hardware lock. An execution unit may release a software lock after and while holding a lock of the hardware lock. The hardware lock is released when a software lock has been set or released.

12 Claims, 7 Drawing Sheets

hardware lock provided by a chip.

HIERARCHICAL SOFTWARE LOCKING

BACKGROUND

Computer software often runs in parallel on a given computer. For example, a program may have multiple threads executing concurrently or in parallel. At times, these threads may operate on shared data or hardware such as a memory block, a register, an object, a device driver, etc. To avoid data collisions and data corruption, locks are used to allow one thread to lock the shared data. To share an object, for example, a group of threads may each have code that requires acquisition of a lock before accessing the shared object. When a thread has acquired the lock, no other thread can acquire the lock and therefore the thread with the lock has exclusive and deterministic access and control of the shared object.

As processor chips have been built with increasing numbers of cores, the need for efficient locking has increased. Such multicore processors have provided for cache coherency, by which cores can deterministically share data. For example, a chip may implement a cache coherency protocol to implement a coherency model. However, as the number of cores on a single chip increases, cache coherency schemes may not scale well and may become inefficient and complex. Yet, it may not be practical to eliminate all forms of chip-based or hardware-based locking, as parallelism may not be practicable (defeating the purpose of multiple cores) or sharing behavior may become non-deterministic.

It may be desirable to provide locking without the use of complex cache coherency protocols, possibly by using lightweight hardware-based locking mechanisms. Techniques related to hybrid hardware-software locking are discussed below.

SUMMARY

The following summary is included only to introduce some concepts discussed in the Detailed Description below. This summary is not comprehensive and is not intended to delineate the scope of the claimed subject matter, which is set forth by the claims presented at the end.

A processor chip may have a built-in hardware lock and deterministic exclusive locking of the hardware lock by execution units executing in parallel on the chip. A set of software locks may be maintained, where the execution units set and release the software locks only by first acquiring a lock of the hardware lock. A first execution unit sets a software lock after acquiring (and while holding) a lock of the hardware lock. Other execution units, even if later exclusively locking the hardware lock, are unable to lock the software lock until after the first execution unit has reacquired a lock of the hardware lock and released the software lock while exclusively locking the hardware lock. An execution unit may release a soft lock while holding a lock of the hardware lock. The hardware lock is released when a software lock has been set or released.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Embodiments described below relate to software locking with minimal hardware support. New generations of multicore processor chips may have inefficient and complex hardware locking facilities, or may have minimal rudimentary locking support. Techniques described below may implement software locks with access to software locks controlled by a hardware lock provided by a chip.

Figure 1:
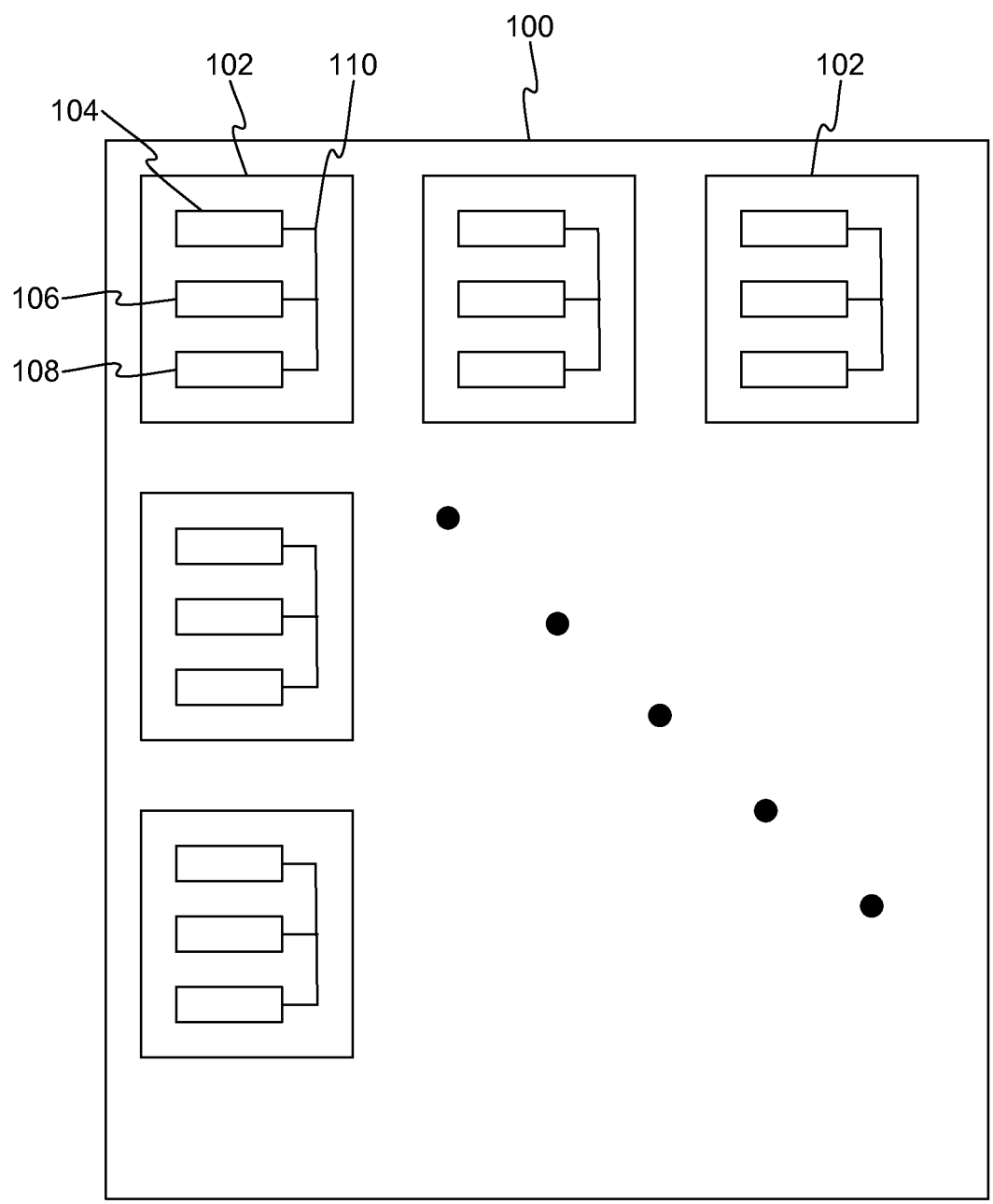
FIG. 1 shows a multicore processor chip.

FIG. 1 shows a multicore processor chip 100. The chip 100 has cores 102, which may vary in number. Each core 102 may have a processing unit 104, a cache 106, and configuration registers 108. These components may communicate via a core bus 110. The cores 102 may communicate via a chip bus, not shown in FIG. 1. Often, intra-core communications will outpace inter-core communications. Moreover, one core may access and manipulate the cache 106 of another core. Consequently, a multicore chip may have a coherency protocol to allow multiple cores to manipulate a cache in a coherent and deterministic manner. However, as mentioned above, this approach may in some cases become a bottleneck, resulting in sub-optimal overall processing speed and reduced utilization of the cores. In one embodiment described herein, the multicore processor chip 100 may have only a simple locking mechanism (either coexisting with or in place of a more complex hardware coherency model). The chip may or may not implement a coherency protocol.

Figure 2:
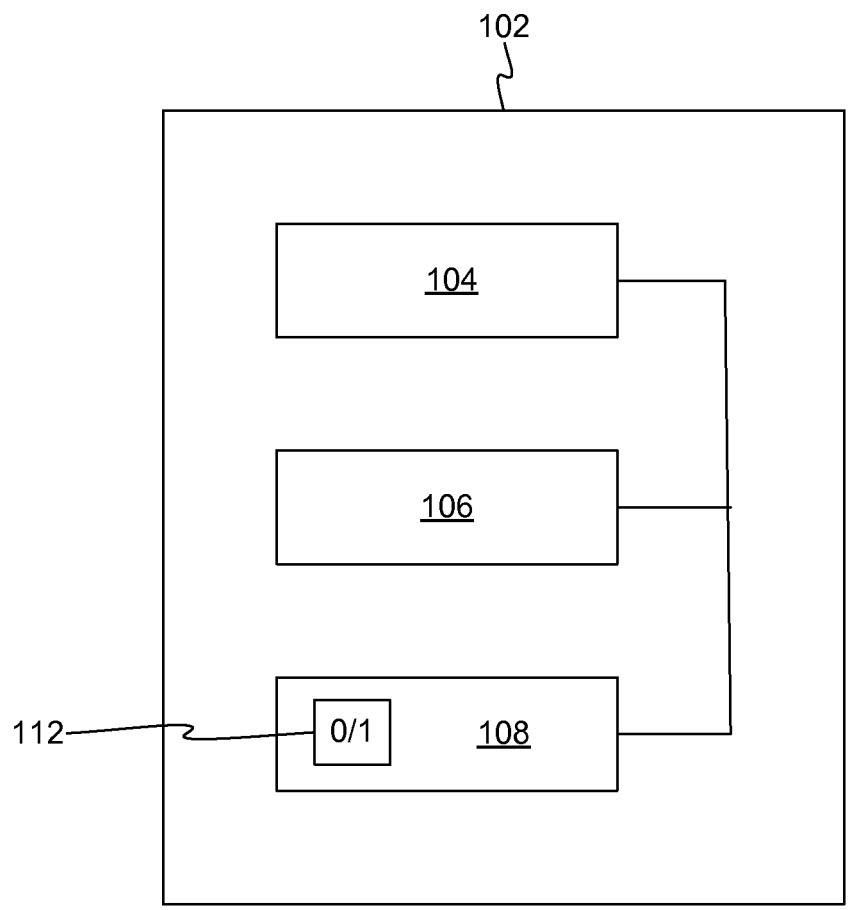
FIG. 2 shows an example of a hardware-based locking mechanism.

FIG. 2 shows an example of a hardware-based locking mechanism. The configuration registers 108 include a lock bit 112. In one embodiment, each core 102 (or pairs sharing a cache) may have a lock bit 112. Note that a word, register, or the like may also serve as the hardware lock. Moreover, the hardware locking mechanism need not be assigned to a core, nor even be on the same chip. The chip 100 includes native instructions for exclusive locking of a lock bit 112. In a basic implementation, the chip 100 may do no more than guarantee that only one core 102 may lock the lock bit 112 at any given time. In other words, when a core 102 attempts to lock a lock bit 112, it either succeeds and is subsequently seen as the lock owner until it releases the lock, or it fails because another core has already locked the lock bit 112. That is, the locking is deterministic between cores. When a core requests a lock of the hardware lock or lock bit 112, the chip 102 will not allow two cores to simultaneously lock the lock bit 112, nor will it allow one core 102 to change the lock bit 112 while it is held by another core 102. Note that this kind of strict exclusion by the hardware lock is not required; it can be sufficient that a lock is by-convention, where all cores adhere to the convention (respect a hardware lock).

In operation, a lock bit 112 or other form of hardware lock may be used by a group of cooperating cores 102 to prevent data collisions on shared data (e.g., shared memory or a shared cache 106). The lock bit 112 of a designated core 102 in the group may—by handshake or the like—act as a group or master lock bit. When a first core in the group is to modify the shared data, it first attempts to lock the group lock bit by issuing an atomic lock instruction implemented by the chip 100. The atomic lock instruction is guaranteed to either set the lock bit 112 to locked (e.g., set the value to "1"), or fail. The atomic lock instruction is implemented such that, for example, when a core successfully locks the lock bit another core issuing the same instruction will not change the state of the group lock bit; either one core or the other is guaranteed to successfully set (acquire) the lock, and the other is guaranteed to fail. Note that cores are referred to only as examples of an execution unit; threads or processes may also manipulated locks.

While the single lock bit or any other simple exclusive locking hardware is efficient and can be readily constructed, this hardware approach may have limitations. The availability of only a fixed number of hardware locks may create bottlenecks or long waits to acquire locks when many threads are attempting to share many objects at the same time.

Figure 3:
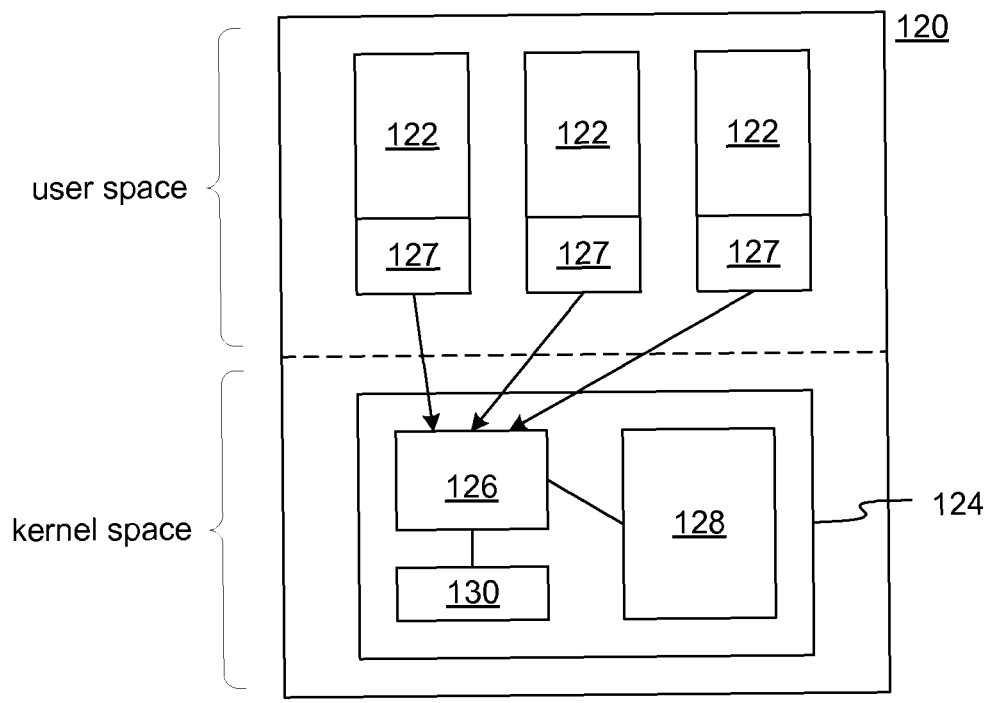
FIG. 3 shows a hybrid software and hardware based locking architecture.

FIG. 3 shows a hybrid software and hardware based locking architecture. A computer 120 including a multicore chip and may have applications 122 (or threads, processes, etc.) running in user space. A locking facility 124 may be managed and executed at the kernel level.

The locking facility 124 may include a logic component 126 that implements an application programming interface (API) or the like, which is invoked by portions 127 of the applications 122 that need to lock shared data. The locking facility 124 may also have data structure 128 in memory that stores software locks (see FIG. 4). The locking facility 124 may also have an interface 130 to the hardware locking of the multicore chip. For example, the interface 130 may have wrapper functions that wrap atomic locking instructions provided by the chip. Operation of the locking facility 124 will be described further below. It should be noted that use of kernel or user space for different components is a design choice; the example of FIG. 3 is only one of many possible configurations. For example, software locks may be stored, modified, etc. by user code but access to same may be managed by kernel level code. In another embodiment, the entire scheme may be implemented in user space.

A user-level kernel-level split, as mentioned above, may also allow a limited amount of hardware resources to be safely shared by multiple applications. This isolation of trust can provide trust compartments. That is, some embodiments can be used to allow mutually non-trusted applications to implement an arbitrary number of software locks within each trust compartment. As the hardware locks can be managed by the operating system kernel, one user-level application does not need to rely on the correctness of another user-level application with respect to hardware lock access.

Figure 4:
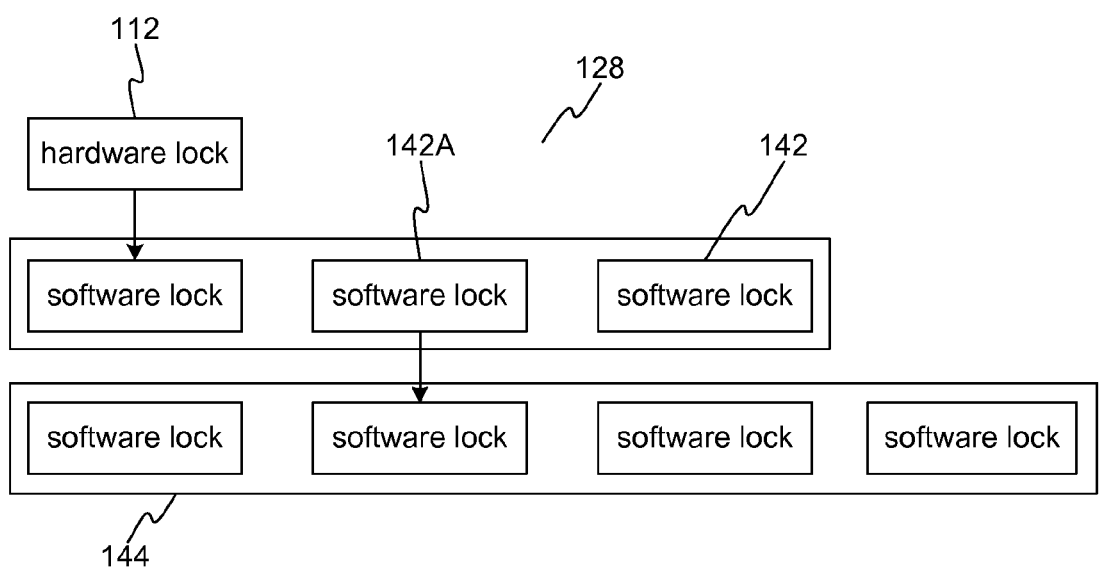
FIG. 4 shows a locking data structure storing software locks.

FIG. 4 shows the locking data structure 128 storing software locks 142. In operation, any two or more execution units (e.g., threads, applications 122, cores, processes, etc.) may use a software lock 142 as a semaphore to control access to data shared between them. The data structure 128 may be stored in any combination of memory, core caches, etc., and managed by the locking facility 124. When a software lock 142 is needed, an execution unit requests a new software lock 142. In one embodiment, the data structure 128 may only be accessed by an execution unit or core that first acquires a lock of the hardware lock 112. For example, to create a new software lock 142, an execution unit first acquires the hardware lock 112, requests a new software lock 142, and then releases the hardware lock 112. In another embodiment, a core is permitted to read from the data structure 140 without first acquiring the hardware lock 112. While sharing between cores has been mentioned, execution units such as threads on a same core can also use the software locking mechanism.

The software locks 142 may serve as locks for any programmatic objects. That is, the software locks are used by the cores to control access to objects or other high level data structures (e.g., an array of file descriptors, a tree of floats, etc.). When a thread, for example, is to access a shared object, the thread first locks the lock data structure 128, then acquires a software lock corresponding to the shared object, releases the hardware lock, and proceeds with the assurance that the shared object will behave deterministically while the software lock is held. Other threads, lacking a lock of the shared object, by convention do not access or modify the shared object (i.e., the object is locked). Usually, multiple different shared objects will not be mapped to the same software lock; each unit of data to be locked has its own software lock. Software locks may be created and used as needed and without limit. Moreover, the locking facility 124 may maintain a mapping of software locks to shared objects. When a user application is to lock a shared object, the application requests a lock of the shared object and the locking facility 124 handles the details of identifying the corresponding software lock, attempting to lock the hardware lock, and checking the software lock.

As will be described below, the data structure 128 may be a hierarchy of software locks, with some software locks, such as software lock 142A, having pointers to lower layers of the hierarchy. To acquire a software lock at a lower layer of the hierarchy, the hardware lock is obtained, and then software locks that point to the lower layers are tested, and if available are set, until the layer containing the desired software lock is reached. If a core or execution unit will be using many related software locks in a given layer, those locks can be acquired by locking the software lock in the layer above that points to the given layer. For example, if layer 144 is to be locked by a process or core, the hardware lock 112 is acquired, and then software lock 142A is acquired. When the hardware lock 112 is then released, the process retains the lock of layer 144 and none of the software locks in that layer can be locked by another process, thread, core, etc.

Figure 5:
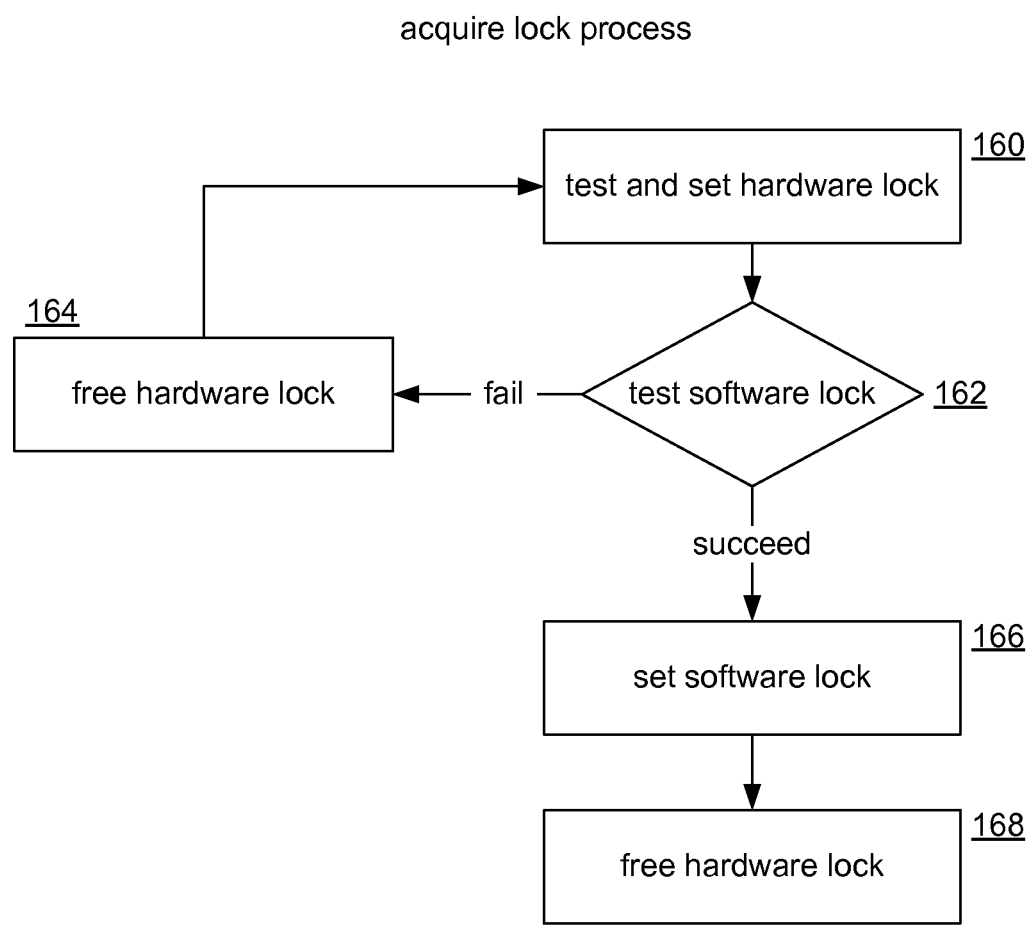
FIG. 5 shows a process to acquire a software lock.

FIG. 5 shows a process to acquire a software lock. In one embodiment, the process may be performed by the locking facility 124, although the process may also be performed individually by each execution unit that will be sharing an object to be locked. The process begins at step 160 with first testing and setting the hardware lock. Depending on the underlying atomic operations that are available, step 160 may involve simply issuing a lock request and receiving a success or failure result. Or, step 160 may involve first testing the state of the hardware lock and then requesting the lock if the test indicates the lock is available. Step 160 may be repeated until the hardware lock is acquired. Once the hardware lock is acquired, the needed software lock is tested at step 162. For example, the content of the software lock (which may be in the form of a memory word) in the data structure may indicate whether the software lock is locked. If the test of the software lock fails (the software lock is already locked), then at step 164 the hardware lock is freed and the process may be repeated, perhaps after some short delay and for a limited number of attempts. If the test succeeds (the software lock is not currently locked), then the software lock is set at step 166. Until released by the core or execution unit that holds the software lock, the software lock cannot be acquired by another core or execution unit, even if the hardware lock has been acquired. Finally, after the software lock has been set as step 166, the hardware lock is freed at step 168, thus allowing access to the lock data structure.

Figure 6:
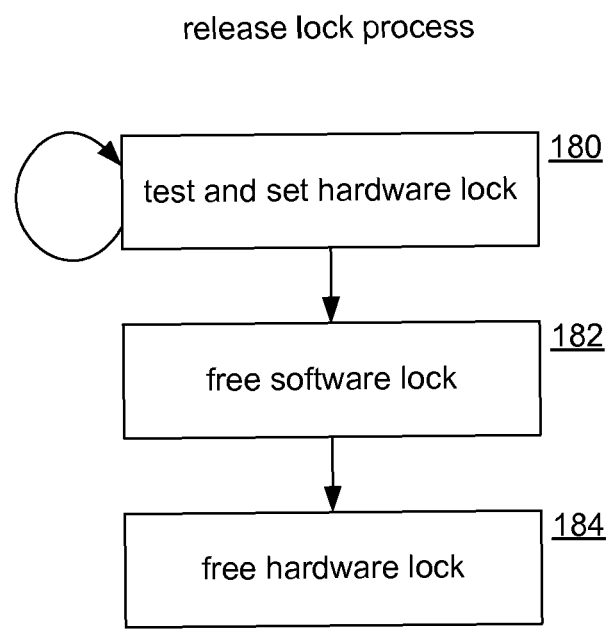
FIG. 6 shows a process for releasing a software lock.

FIG. 6 shows a process for releasing a software lock. As in other cases where the software locks need to be accessed, the hardware lock is first tested at step 180 and locked if available. Assuming that the hardware lock was acquired, the software lock is then freed (e.g., the corresponding memory storing the software lock is changed to hold a value that indicates the software lock is not locked). As step 184, the hardware lock is freed. Regarding the acquisition of the hardware lock for releasing the software lock, note that this may not be necessary, depending on implementation of the software lock mechanism or depending on the particular application. For simple software lock implementations (e.g., flipping a single bit), the hardware lock likely will not need to be acquired. However, there can be other implementations where releasing the software lock requires exclusive access to the complex software lock structures. In that case, a hardware lock would first be acquired prior to releasing the software lock.

As can be seen from the processes of FIGS. 5 and 6, an extensible set of software locks can be maintained with a hardware-supported guarantee of deterministic access to the software locks and consequently deterministic locking/unlocking of the software locks. Furthermore, because the hardware lock data structure may be locked only as long as needed to lock or unlock a software lock, the hardware lock may have high availability (i.e., a low duty cycle where locked time is small relative to unlocked time). At the same time, the software locks have state that extends beyond the time when the hardware lock has been released.

Figure 7:
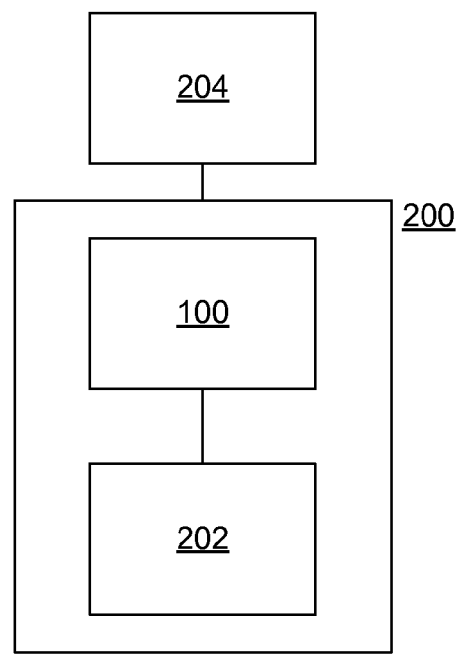
FIG. 7 shows a computer on which one or more embodiments described above may be implemented.

FIG. 7 shows a computer 200 on which one or more embodiments described above may be implemented. A multicore processor 100 is coupled with memory/storage 202 and a display 204. Note that a multicore processor is not required. A single core processor with a single hardware lock can also be used. Embodiments and features discussed above can be realized in the form of information stored in volatile or nonvolatile computer or device readable storage media. This is deemed to include at least media such as optical storage (e.g., compact-disk read-only memory (CD-ROM)), magnetic media, flash read-only memory (ROM), or any current or future means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method of providing locks in a computer comprised of a processor chip comprising a plurality of cores, wherein the chip further comprises a hardware lock, the method comprising:

maintaining a data structure comprising software locks stored in memory, the data structure corresponding to a processor chip comprising a plurality of cores, wherein the chip includes a register comprising a hardware lock;

attempting to lock the hardware lock by any given one of the plurality of cores whenever the given core is to lock any given one of the software locks, wherein attempting to lock the hardware lock is performed by at least a locking instruction native to the chip;

when the attempt to lock the hardware lock by the given core is successful, testing whether the given software lock is locked, and:

when the given software lock is not locked, locking the given software lock by the given core, wherein the other cores also attempt to lock the hardware lock prior to attempting to lock the given software lock, and not allowing the other cores to lock the given software lock while the hardware lock is held by the given core; and when the given software lock is locked successfully by the given core, releasing the hardware lock by the given core;

when the attempt to lock the hardware lock by the given core is not successful, the given core responds by not accessing the data structure, wherein other than the given core, no other core is allowed to access the data structure from when the hardware is locked until the hardware lock is released by the given core, the data structure comprises a hierarchy of sets of software locks comprising a first set of software locks and a second set of software locks, the given software lock is included in the second set of software locks, and the second set of software locks is accessed by the given core only after obtaining access to another software lock in the first set of software locks; and after the hardware lock is released by the given core, when another core is to lock the given software lock, the other core locks the hardware lock to obtain exclusive access to the data structure, and does not lock the given software lock as a result of the existing lock of the given software lock created by the given core.

2. A method according to claim 1, further comprising releasing the hardware lock by the given core in response to locking the given software lock, and wherein the given core does not require the hardware lock to release the software lock.

3. A method according to claim 1, wherein the locking instruction comprises an atomic instruction.

4. A method according to claim 1, wherein the chip does not natively provide cache coherence.

5. One or more computer readable storage media, wherein the storage media is not a signal, the storage media storing information to enable a chip to perform a process, wherein the chip includes a built-in hardware lock and deterministic access to the hardware lock by execution units executing in parallel on respective cores of the chip, the process comprising:

maintaining a set of software locks and the execution units set and release the software locks only by first acquiring a lock of the hardware lock, wherein a first execution unit sets a software lock only after acquiring a lock of the hardware lock, and other execution units: lock and release the hardware lock but do not lock the software lock until after the first execution unit has released the software lock;

storing a hierarchical data structure comprised of subsets of software locks, wherein a first subset comprises a first software lock that points to a second subset, wherein the second subset comprises a second software lock, and wherein when a lock of the second software lock is requested, first acquiring a lock of the hardware lock, then acquiring a lock of the first subset, then acquiring a lock of the second subset; and wherein the software locks are only modified by an execution unit that currently has acquired a lock of the hardware lock, and by convention only one execution unit at a time holds the hardware lock.

6. One or more computer readable storage media according to claim 5, wherein the chip comprises a processor comprised of the cores, and the hardware lock comprises a lock bit on a core, and each core has a lock bit.

7. One or more computer readable storage media according to claim 5, wherein acquiring the hardware lock is performed with kernel level permission and user-level code running on the chip locks the software locks.

8. A computer comprising:

a chip comprising a plurality of cores and a register comprising a hardware lock exclusively lockable by any of the cores using an atomic lock operation provided by the chip;

storage storing instructions that when executed cause the chip to perform steps comprising:

storing a data structure in memory, the data structure comprising a plurality of software locks lockable by execution units running on the computer, wherein when any given core running an execution unit attempts to lock any given one of the software locks, the given core must first successfully acquire a lock of the hardware lock using at least a locking instruction native to the chip, and when the given core successfully acquires the hardware lock the given core tests whether the given software lock is locked and if the given software lock is not locked the given core locks the given software lock, wherein only a core currently having acquired a lock of the hardware lock can lock any of the software locks such that while the lock on the hardware lock is held by the given core other cores are prevented from locking any of the software locks, and wherein an execution unit that locks the hardware lock releases the hardware lock in response to either determining that a software lock is locked or in response to determining that a software lock is not locked and locking same such that when the given core locks the given software lock the given core releases the hardware lock, wherein the data structure comprises a hierarchy of the software locks, and wherein any core having the hardware lock and attempting to lock a first software lock below a second hardware lock in the hierarchy is not able to do so if the second hardware lock is locked.

9. A computer according to claim 8, wherein the storage comprises memory coupled with the chip, cache memory on the chip, or non-volatile storage media.

10. A computer according to claim 8, wherein when a core is to acquire a target software lock, the core makes a first attempt to lock the hardware lock, and only when the first attempt is successful, the core then checks whether the target software lock is locked, and when the target software lock is not locked the core locks the target software lock, where the core releases the hardware lock after attempting to lock the target software lock regardless of whether the attempt to lock the software lock was successful.

11. A computer according to claim 10, wherein after the core has successfully locked the target software lock and released the lock of the hardware lock, and after other cores have locked the hardware lock and modified other of the software locks, the core makes a second attempt to lock the hardware lock, and when successful releases the lock of the target software lock, and then releases the lock of the hardware lock.

12. A computer according to claim 11, wherein cores only hold locks of the hardware lock while they are in the process of locking the software locks, whereby any third software lock is held by any first core through plural locks and releases of the hardware lock by other cores until the first core releases the third software lock while holding a lock of the hardware lock.

* * * * *